US010783505B2

(12) United States Patent
Arana (10) Patent No.: US 10,783,505 B2
(45) Date of Patent: Sep. 22, 2020

(54) SYSTEMS AND METHODS FOR PROVIDING MEDIA CONTENT

(71) Applicant: Disney Enterprises, Inc., Burbank, CA (US)

(72) Inventor: Mark Arana, West Hills, CA (US)

(73) Assignee: Disney Enterprises Inc., Burbank, CA (US)

( * ) Notice: Subject to any disclaimer, the term of this patent is extended or adjusted under 35 U.S.C. 154(b) by 868 days.

(21) Appl. No.: 14/456,478

(22) Filed: Aug. 11, 2014

(65) Prior Publication Data

US 2016/0042158 A1  Feb. 11, 2016

(51) Int. Cl.
*G06F 21/10* (2013.01)
*G06Q 20/12* (2012.01)
*G06F 12/14* (2006.01)
*G06F 21/60* (2013.01)

(52) U.S. Cl.
CPC ......... *G06Q 20/1235* (2013.01); *G06F 21/10* (2013.01); *G06F 12/14* (2013.01); *G06F 21/60* (2013.01)

(58) Field of Classification Search
CPC ............................ G06Q 20/1235; G06F 21/10
See application file for complete search history.

(56) References Cited

U.S. PATENT DOCUMENTS

| | | | | |
|---|---|---|---|---|
| 5,636,277 A * | 6/1997 | Nagahama | ............... | G06F 21/10 705/53 |
| 6,389,538 B1 * | 5/2002 | Gruse | ..................... | G06F 21/10 705/51 |
| 6,738,905 B1 * | 5/2004 | Kravitz | .................... | H04K 1/00 348/E5.004 |
| 8,806,659 B1 * | 8/2014 | Miazzo | ................... | G06F 21/10 726/30 |
| 8,818,169 B2 * | 8/2014 | Stewart | .................. | H04N 5/913 386/248 |
| 9,171,298 B2 * | 10/2015 | Atkinson | ........... | G06Q 20/1235 |
| 2002/0080969 A1 * | 6/2002 | Giobbi | ..................... | G06F 21/10 380/277 |
| 2003/0097655 A1 * | 5/2003 | Novak | ............... | G06Q 20/3821 705/59 |
| 2003/0188183 A1 * | 10/2003 | Lee | ......................... | G06F 21/10 726/30 |

(Continued)

FOREIGN PATENT DOCUMENTS

WO    WO-2007103700 A2 *  9/2007  ........... H04N 7/1675

OTHER PUBLICATIONS

AACS, Advanced Access Content System: Pre-recorded Video Book, Revision 0.953, Final, Oct. 26, 2012.*

(Continued)

*Primary Examiner* — Jacob C. Coppola
(74) *Attorney, Agent, or Firm* — Farjami & Farjami LLP (57) ABSTRACT

The present disclosure provides for systems and methods for delivering and unlocking restricted media content on physical media. The disclosed methods and systems provide restricted media assets on a physical media. The restricted media assets may be ad-sponsored media content. Restrictions on the restricted media assets may be removed by providing an unlock code, either on an online or offline media player. In the ad-sponsored media context, an unlocked version might comprise an ad-free version.

12 Claims, 4 Drawing Sheets

(56) References Cited

U.S. PATENT DOCUMENTS

| | | | | |
|---|---|---|---|---|
| 2003/0223736 A1* | 12/2003 | Muzaffer | ............... | H04N 5/765 386/231 |
| 2004/0001087 A1* | 1/2004 | Warmus | ................ | G06Q 30/02 715/745 |
| 2004/0039923 A1* | 2/2004 | Koskins | .................. | G06F 21/10 705/51 |
| 2004/0133794 A1* | 7/2004 | Kocher | ............ | G11B 20/00086 713/193 |
| 2010/0250438 A1* | 9/2010 | Hamnen | ............ | G06Q 20/1235 705/52 |
| 2014/0289759 A1* | 9/2014 | Nakano | ................. | G06Q 30/06 725/31 |
| 2015/0026820 A1* | 1/2015 | Arana | ..................... | G06F 21/10 726/27 |

OTHER PUBLICATIONS

J. C. Williams, K. Rajagopalan and R. Bauer, "A Promising Future: Content Protection and Anti-Piracy," in SMPTE Motion Imaging Journal, vol. 115, No. 9, pp. 334-341, Sep. 2006, doi: 10.5594/J16151. (Year: 2006).*

G. Myles and S. Nusser, "Content protection for games," in IBM Systems Journal, vol. 45, No. 1, pp. 119-143, 2006, doi: 10.1147/sj.451.0119. (Year: 2006).*

C. B. S. Traw, "Protecting digital content within the home," in Computer, vol. 34, No. 10, pp. 42-47, Oct. 2001, doi: 10.1109/2.955097. (Year: 2001).*

* cited by examiner

FIG. 3
RESTRICTED CONTENT ACCESS METHOD 300

FIG. 4

SYSTEMS AND METHODS FOR PROVIDING MEDIA CONTENT

TECHNICAL FIELD

The present disclosure relates generally to physical media, and more particularly to systems and methods for providing media content on physical media.

SUMMARY OF THE INVENTION

The present disclosure may be embodied in a method comprising: providing a physical media configured to be played on an offline media player, the physical media comprising one or more restricted digital media assets and a unique identifier; and providing a user with an unlock code corresponding to the unique identifier, wherein the unlock code unlocks one or more of the restricted digital media assets when the physical media is played on the offline media player.

The unique identifier may identify the physical media, and the unlock code may unlock all restricted digital media assets on the physical media.

In a more specific embodiment, the physical media may further comprise a plurality of subsets, each subset comprising one or more restricted digital media assets, and a plurality of unique identifiers, each of the plurality of unique identifiers identifying one of the plurality of subsets. In this configuration, the unlock code may unlock only those restricted digital media assets that are part of the subset identified by the unique identifier. In one aspect of this embodiment, the unique identifier may be used to derive the unlock code. In a further aspect, the physical media may be identified by a disc identifier, and the unique identifier and the disc identifier may be used to derive the unlock code.

The method may further comprise receiving the unique identifier from the user. The unique identifier may be received via telephone and/or as a QR code corresponding to the unique identifier. Receiving the unique identifier and providing the user with an unlock code may be performed via the Internet.

The method may further comprise receiving the unlock code. The unlock code may be received via communications with a secondary device, possibly using a wireless communications standard such as Bluetooth or NFC.

In a specific embodiment, the physical media may comprise an advertising-supported media content asset, and the one or more restricted digital media assets may comprise an advertising-free media content asset, wherein the advertising-free media content asset is an advertising-free version of the advertising-supported media content asset. In a further aspect of this specific embodiment, the unique identifier may identify the advertising-free media content, and the unlock code may unlock the advertising-free media content for play on the offline media player.

The present disclosure may also be embodied in a method comprising: providing a physical media containing an advertising-sponsored media content asset; and when a condition is met, providing an unlock code corresponding to an advertising-free media content asset, where the advertising-free media content asset is an advertising-free version of the advertising-sponsored media content asset.

The present disclosure may also be embodied in non-transitory computer readable medium comprising an instruction set configured to command a computing device to carry out the methods described herein.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

Physical media remains a popular medium through which media content is sold and distributed. Popular examples of physical media that deliver audio and/or visual media content include CDs, DVDs, and Blu-Ray discs. In order to encourage more widespread use and purchase of physical media, it may be desirable to provide physical media at different price points, and to provide varying levels of convenience or accessibility based on the prices consumers are willing to pay.

The present disclosure provides for systems and methods for unlocking restricted media content on physical media. The disclosed systems and methods, among other advantages, allow users to purchase physical media for lower prices if they are willing to accept decreased convenience or accessibility. At the same time, using the same physical media, consumers who are willing to pay for greater convenience or access are able to receive those benefits. In this way, media content producers are able to distribute a single physical media product while meeting the needs of different consumers who are willing to pay varying prices for varying levels of access or convenience.

In the disclosed systems and methods, a piece of physical media containing one or more restricted media content assets is provided to consumers. Restricted media content may comprise any media content that has some restriction on its access, and requires one or more conditions to be satisfied before a user has full access to the content. Restricted media content may be content that cannot be accessed at all until a particular condition is met. For example, media content assets may be locked so that users are unable to view them until after an official release date or until the restricted media content is purchased.

Figure 2:
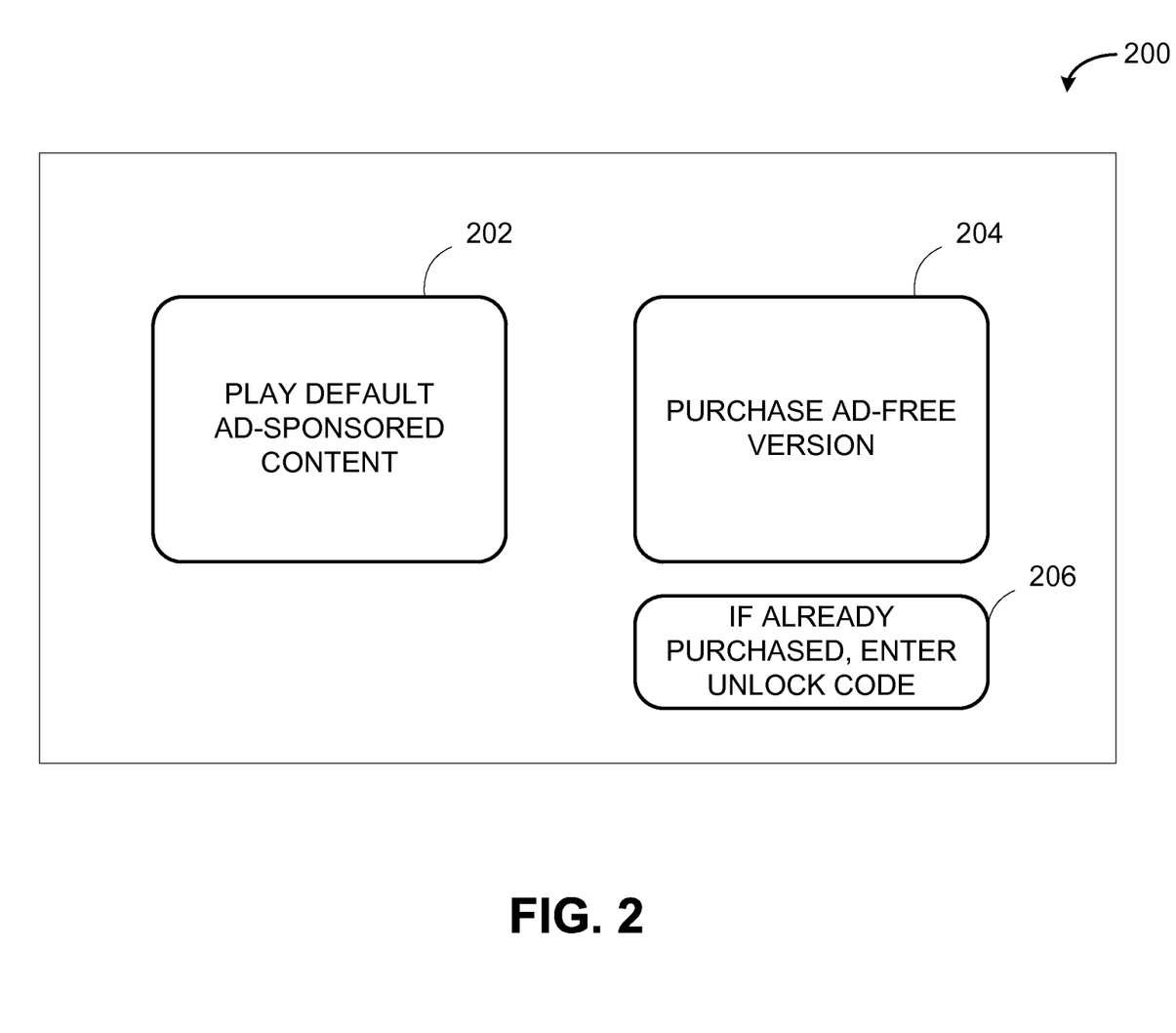
FIG. 2 illustrates a sample user interface in accordance with an aspect of an embodiment of the present disclosure.

Users may be granted limited access to certain media content until they acquire access to the restricted media content. For example, users may be granted access to an ad-sponsored version of a media content asset when they purchase the physical media, e.g., movies with commercial interruptions or ads displayed at the top or bottom of the screen during the movie, but users cannot access the ad-free version (the "restricted content") until they pay an additional fee. FIG. 2 provides an example user interface 200, in which a user may select the default, ad-sponsored media content

202, or may opt to purchase the ad-free media content 204. If the user has already purchased the ad-free media content and has obtained an unlock code (discussed in greater detail below), the user may enter the unlock code (206). In this example, content producers can sell the physical media for lower prices, thereby attracting a greater number of consumers, because the physical media will only allow consumers to access ad-sponsored versions of the content. However, for those consumers who wish to have full access to the content, those consumers can pay higher prices to unlock greater access, while still using the same piece of physical media.

The restrictions on restricted media content assets may be unlocked via an unlock code. Unlock codes may be provided to a user's entertainment system in either an online or offline capacity, each of which will be discussed in greater detail below.

The unlock code provides the user with access to the restricted media content asset. In the release-date example above, users may not have any access to media content at all until the release date, at which point they are provided with an unlock code to unlock and view the media content. In another example, users may be provided with free copies of the locked physical media, and may have access to certain assets on the physical media (e.g., trailers or posters, etc.), but cannot access other restricted assets (e.g., the actual feature film), until they purchase an unlock code. In the example of ad-sponsored media content, an unlock code may provide access to an ad-free version, or a version with fewer advertisements.

Unlock codes may unlock all media content assets on physical media, or a subset. In order to protect against piracy and sharing of unlock codes, it may be preferable for unlock codes to be uniquely associated with a particular piece of physical media, a particular media content asset, or a particular grouped set of media content assets. If an unlock code is used to unlock all media content assets on a piece of physical media, then the unlock code may be derived from a unique identifier corresponding to the individual physical media. An example of such a unique identifier is the pre-recorded media serial number (PMSN) currently used to identify individual Blu-Ray discs. If an unlock code is used to unlock only certain media content assets on a physical media, then each media content asset, or grouped set of media content assets, can be assigned a unique event code from which the unlock code is derived. Event codes need not be globally unique if the unique physical media identifier in conjunction with the event code is unique. While a unique unlock code is preferable in order to minimize the chance of piracy or sharing of unlock codes, it should be understood that this is not a requirement to apply the teachings of the present disclosure.

Figure 1:
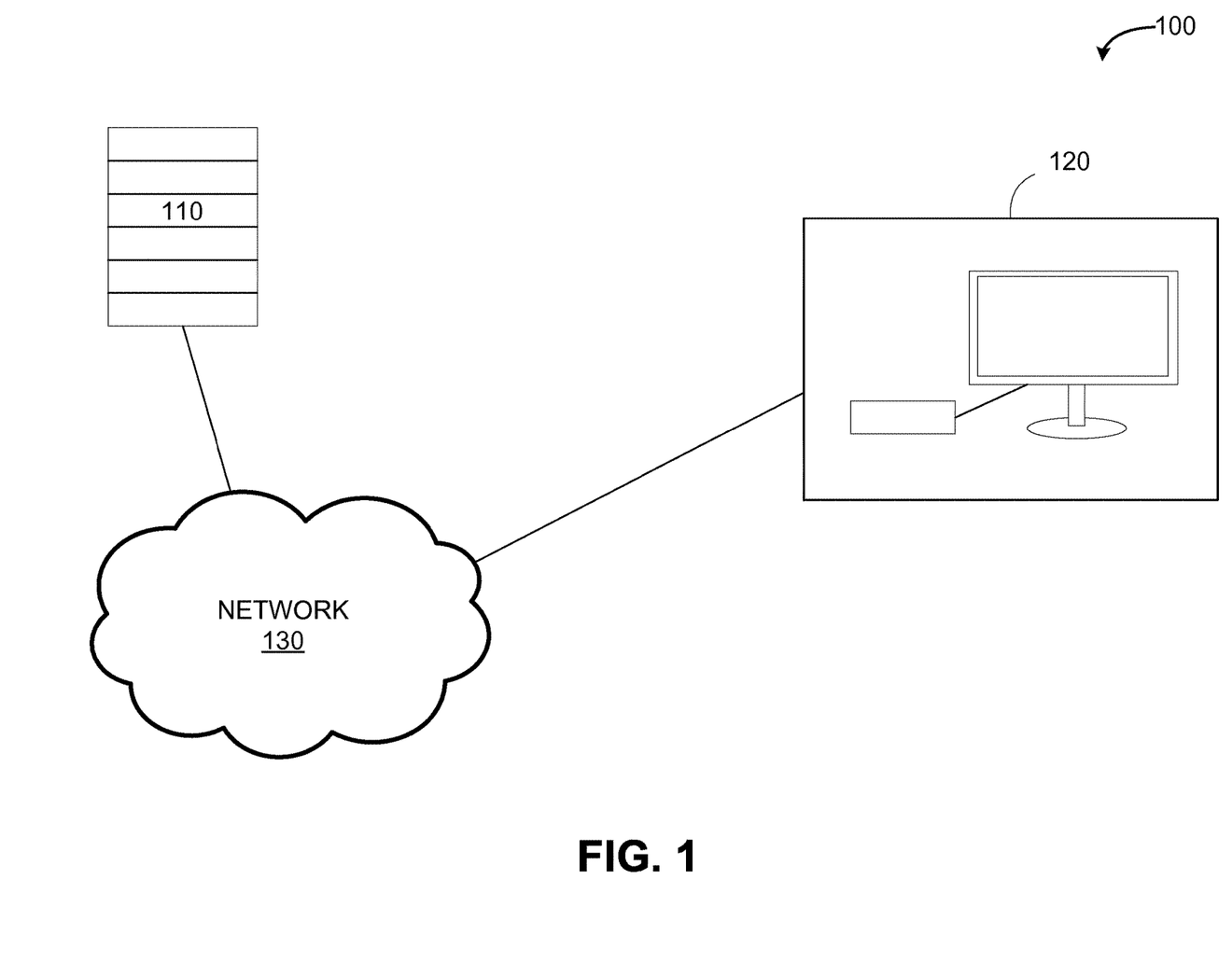
FIG. 1 provides a media security network in accordance with an aspect of an embodiment of the present disclosure.

FIG. 1 provides a representation of a media security network 100, demonstrating an "online" entertainment system configuration. The media security network 100 includes a remote server 110 and a user entertainment system 120 connected over a wide-area network 130, such as the Internet. The user entertainment system 120 is any device on which the user can experience physical media, examples of which may include a Blu-Ray player or DVD player or other home entertainment system, a personal and/or laptop computer, a home gaming system, or the like. The remote server 110 may be any data server that is used to provide and/or store media content security information or other digital media information, such as unlock codes. The network 130 may be any wide-area network over which information may be sent and received, such as the Internet.

It should be understood that FIG. 1 is a simple block representation of a content distribution network, and each of the different components may comprise numerous components or modules to carry out the functions described herein. For example, there may be numerous remote servers, and different remote servers may play different roles. Similarly, the user's local entertainment system 120 may comprise numerous components and may comprise numerous devices through which a user can experience physical media. In certain embodiments, the user entertainment system 120 may also comprise a local network for storing, transmitting, and receiving digital media information between the various devices on a user's local network.

In the "online" configuration shown in FIG. 1, when a user attempts to access restricted media content (e.g., by selecting button 204 in FIG. 2), the entertainment system 120 may communicate directly with the remote server 110 to receive an unlock code. In this scenario, the remote server 110 might store information as to whether or not all conditions have been met to unlock the content (e.g., release date has passed, or user has paid the purchase fee). If these conditions are met, the entertainment system 120 is provided with an unlock code and the user is able to access the restricted media content asset(s).

The unlocked version of the media content may be stored on the physical media along with the restricted content, so that, using the unlock code, the entertainment system 120 can play the formerly restricted, and now unlocked, content from the physical media. Alternatively, in this "online" context, the unlocked version may be provided over the network 130 from the remote server 110 to the entertainment system 120. In the latter scenario, rather than providing an unlock code, the remote server 110 may provide the content itself to the entertainment system 120.

Using the ad-supported example discussed above, a user might purchase a Blu-Ray disc containing a feature film. The Blu-Ray disc is sold for a lower price because it contains an ad-supported version of the film. Ads may be contained on the disc itself, or may be provided over the Internet, or a combination of both. Access to the ad-free version of the film is restricted, and the user has the option to pay an extra fee to view the ad-free version of the film, as shown in FIG. 2. This fee may be paid at the time of purchase, or at a later date. If the user decides to purchase the ad-free version, the purchase information is associated with that user's particular Blu-Ray disc so that the access to the ad-free version cannot be shared with another user who has not purchased ad-free access. The remote server 110 stores data for each Blu-Ray disc and whether ad-free access has been purchased. When the user places the disc into a Blu-Ray player, the player/entertainment system 120 may contact the remote server 110 to see whether the user has permission to view an ad-free version of the film. If the user has not purchased ad-free access, then the entertainment system 120 plays the default ad-supported version. If the user has purchased ad-free access, then the remote server 110 provides the entertainment system 120 with an unlock code associated with the individual Blu-Ray disc (or with the ad-free version of the film if there are multiple locked media assets on the disc), allowing the user access to the ad-free version of the film.

The systems and methods discussed above may also be implemented if the entertainment system 120 is not connected to any network, or is "offline." In this scenario, when a user places the physical media into the entertainment system 120, the user may be asked to enter an "unlock code" in order to access any restricted content or the "unlocked versions" of restricted content (e.g., button 206 of FIG. 2).

The entertainment system 120 and/or the physical media may contain hardware or software necessary to confirm whether or not the unlock code is correct.

A user can obtain the unlock code in several ways, some of which are outlined here. The user may dial a phone number, provide their unique disc code (or event code), and receive an unlock code to enter. The user may also use a computing device to transfer the unique disc code or event code to a web service, that can then return an unlock code (if the conditions are met for the user to receive an unlock code). For example, the computing device may be a mobile phone or other mobile device, and the user can submit the unique disc code to a web service and receive the unlock code on their mobile device. Submission of the unique disc code may be done by manually entering the disc code, or by taking a photo of a QR code corresponding to the unique disc code and transmitting the image, or any other appropriate means. Similarly, the user may use a laptop or personal computer to access a webpage, where they can enter the unique disc code information to receive the event code.

Once the user has entered a valid unlock code, the entertainment system 120 can access and play the corresponding restricted content. Entry of the unlock code may be manually performed by the user, or may be digitally performed by a secondary device. For example, if the user requests the unlock code via a mobile phone or personal computing device, the offline entertainment system 120 may communicate with the mobile phone or personal computing device via near-field communication (NFC), Bluetooth communication, or the like.

Figure 3:
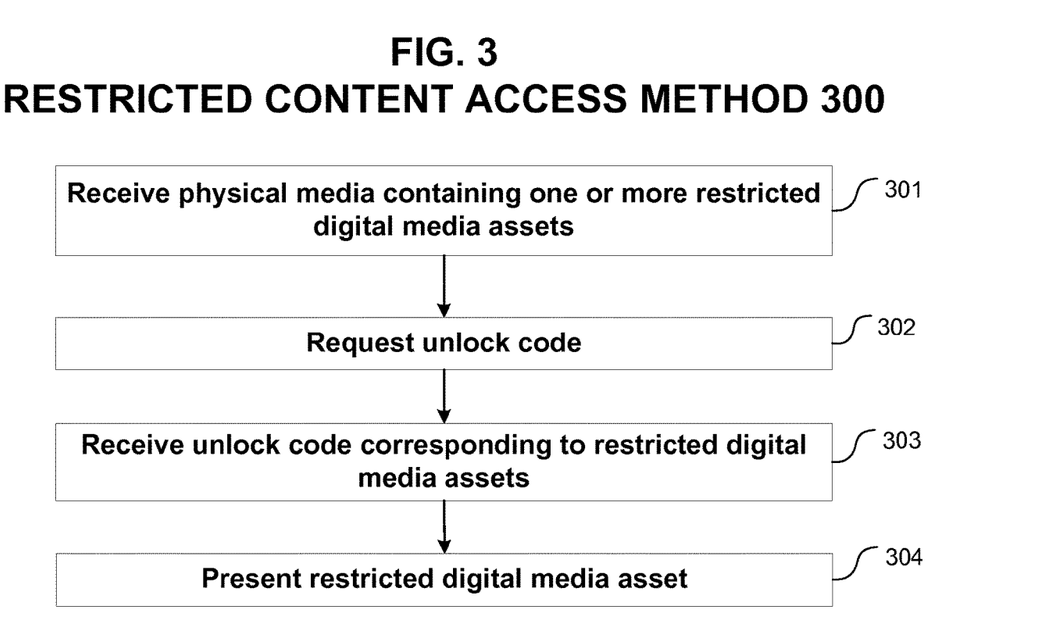
FIG. 3 provides a flow chart representation of a method for unlocking restricted media content in accordance with an embodiment of the present disclosure.

FIG. 3 provides a flowchart representation of a restricted content access method 300. First, physical media containing one or more restricted digital media assets is received in step 301. Next, the user's entertainment system, having detected restricted digital media assets, requests an unlock code to access the restricted digital media assets (302). The request may be directed to the remote server 110 (in an online setting), or the request may be directed to the user (in either an online or offline setting). For example, in the interface shown in FIG. 2, the user may directly input an unlock code via button 206, or the user may purchase access to the restricted digital media asset via button 204, in which case the remote server 110, upon receiving payment, may automatically provide the media player with the unlock code. The entertainment system then receives an unlock code which corresponds to one or more restricted digital media assets (303). The entertainment system may then present the restricted digital media asset for which an unlock code has been received (304).

It should be understood that while the figures have presented exemplary embodiments of the present systems and methods, revisions may be made to the disclosed systems and methods without departing from the scope of the present disclosure.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 4:
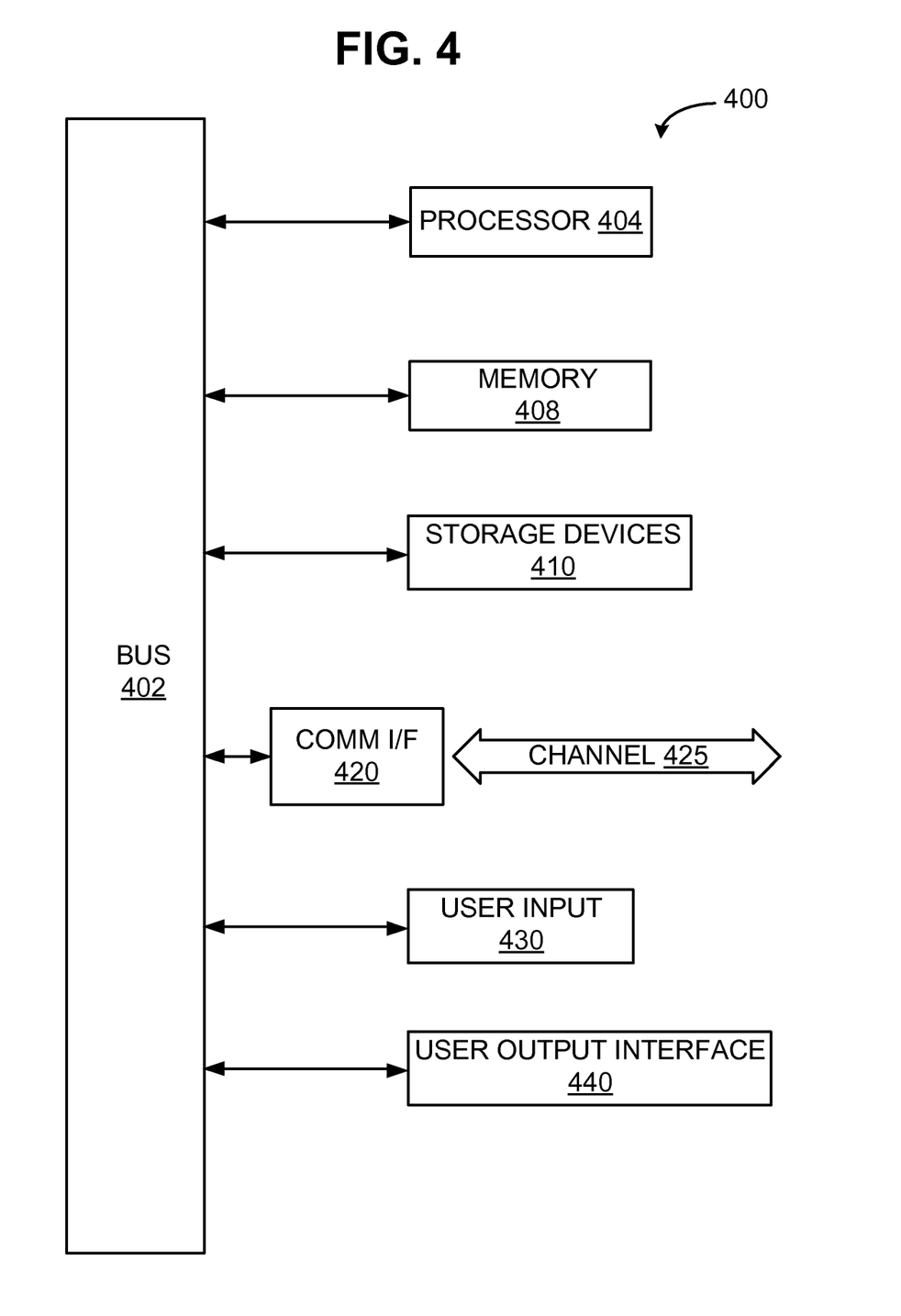
FIG. 4 illustrates a sample computing module that may be used to implement certain features and embodiments of the present disclosure.

Referring now to FIG. 4, computing module 400 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 400 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, random access memory (RAM) or other dynamic memory might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404. The computing module 400 might also include one or more various storage devices 410, which might include, for example, a magnetic tape drive, an optical disc drive, a solid state drive, removable storage media such as a CD or DVD, or any other non-volatile memory.

Computing module 400 might also include a communications interface 420. Communications interface 420 might be used to allow software and data to be transferred between computing module 400 and external devices. Examples of communications interface 420 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 420 might typically be carried on signals, which can be electronic, electromagnetic (which includes optical) or other signals capable of being exchanged by a given communications interface 420. These signals might be provided to communications interface 420 via a channel 425. This channel 425 might carry signals and might be implemented using a wired or wireless communication medium. Some examples of a channel might include a phone line, a cellular link, an RF link, an optical link, a network interface, a local or wide area network, and other wired or wireless communications channels.

Computing module 400 might also include one or more user inputs 430. The user input allows for the user to enter commands to the computing module 400 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 400 might also include one or more user output interfaces 440. The user output interfaces 440 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 408, storage unit 410, and channel 425. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. A method, comprising:
  receiving a physical media for playback on an offline media player, the physical media comprising:
    a first set of digital media assets, wherein the first set of digital media assets are accessible upon receiving and inserting the physical media into the offline media player;
    a second set of digital media assets, wherein the second set of digital media assets are accessible upon receiving a first unlock code at the offline media player;
    a third set of digital media assets and a unique event code associated with the third set of digital media assets, wherein the third set of digital media assets are accessible upon receiving a second unlock code at the offline media player; and
    a unique identifier identifying the physical media, wherein the offline media player is a first device associated with a user;
  upon receiving the physical media at the offline media player, enabling to play the first set of digital media assets, wherein the first set of digital media assets are enabled to play without receiving the first unlock code or the second unlock code;
  receiving, at the offline media player, a request to access the second set of digital media assets;
  upon determining that the first unlock code associated with the second set of digital media assets has not been entered at the offline media player, blocking access to the second set of digital media assets;
  requesting, at the offline media player, user entry of the second unlock code to access the third set of digital media assets;
  transmitting, over a network and from a user device to a web service, the unique event code associated with the third set of digital media assets and the unique identifier identifying the physical media, wherein the user device is a second device associated with the user;
  receiving, over the network and at the web server from the user device, the unique event code associated with the third set of digital media assets and the unique identifier identifying the physical media;

upon detection, at the web server, of an occurrence of a release date associated with the second set of digital media assets, deriving the second unlock code from the unique event code associated with the third set of digital media assets and the unique identifier identifying the physical media;

transmitting, over the network and by the web server to the user device, the second unlock code;

receiving, over the network, the second unlock code at the user device from the web service;

receiving, at the offline media player, user entry of the second unlock code;

unlocking, at the offline media player, the third set of digital media assets; and enabling to play the third set of digital media assets or the first set of digital media assets, without enabling to play the second set of digital media assets.

2. The method of claim 1, wherein the physical media is a disc and wherein the unique identifier identifying the physical media is a prerecorded media serial number (PMSN).

3. The method of claim 1, wherein the user device is a smartphone, tablet, laptop, or desktop computer.

4. The method of claim 3, wherein the user device is the smartphone, wherein transmitting the unique identifier from the user device to the web service comprises the smartphone taking a picture of a QR code corresponding to the unique identifier.

5. The method of claim 1, wherein the user device is communicatively coupled to the offline media player, wherein receiving user entry of the second unlock code at the offline media player comprises the user device wirelessly transmitting the second unlock code to the offline media player.

6. The method of claim 5, wherein the user device is communicatively coupled to the offline media player via a Bluetooth connection, wherein the user device transmits the second unlock code to the offline media via the Bluetooth connection.

7. The method of claim 1, wherein the physical media is a disc.

8. The method of claim 1, wherein the unique identifier identifying the physical media is a pre-recorded media serial number (PMSN).

9. The method of claim 1, wherein the physical media stores one or more unrestricted digital media assets related to one or more restricted digital media assets, wherein the one or more unrestricted digital media assets are accessible and playable without entry of the second unlock code.

10. The method of claim 9, wherein the one or more restricted digital media assets comprise a feature film.

11. The method of claim 10, wherein the one or more unrestricted digital media assets comprise a trailer of the feature film.

12. The method of claim 10, wherein the one or more unrestricted digital media assets comprise a poster of the feature film.

* * * * *